3,457,268
PYRROLO, PYRIDO, AND AZEPINO[2,3-b] INDOLES
Albert J. Frey, Essex Fells, William J. Houlihan, Mountain Lakes, and Robert E. Manning, Parsippany, N.J., assignors to Sandoz Inc., Hanover, N.J.
No Drawing. Continuation-in-part of application Ser. No. 562,537, July 5, 1966, which is a continuation-in-part of application Ser. No. 464,839, June 17, 1965. This application Apr. 21, 1967, Ser. No. 632,555
Int. Cl. C07d 57/02, 41/08, 27/24
U.S. Cl. 260—293                                   37 Claims

ABSTRACT OF THE DISCLOSURE

3a - phenyl - 1,2,3,3a,8,8a-hexahydropyrrolo[2,3-b]indoles (A), 4a-phenyl-2,3,4,4a,9,9a-hexahydro-1H-pyrido-[2,3-b]indoles (B) and 5a-phenyl-1,2,3,4,5,5a,10,10a-octahydroazepino[2,3-b]indoles (C) are CNS-active compounds useful as, e.g., antidepressants, hypotensive-antihypertensives and analgesics. They are prepared from corresponding 3-phenyloxindoles (D) by, e.g., substituting in the 3-position of (D) the corresponding cyanoalkyl group and effecting ring closure of the resultant (E) in the presence of lithium aluminum hydride to obtain either (A), (B) or (C), depending upon whether (E) is prepared with a haloacetonitrile, halopropionitrile or halobutyronitrile.

---

This application is a continuation-in-part of application Ser. No. 562,537 filed July 5, 1966 now abandoned, which in turn is a continuation-in-part of application Ser. No. 464,839 filed June 17, 1965, now abandoned.

The instant invention is directed to (a) pharmaceutically acceptable compounds of the formula (I)

wherein:

$n$ is either 0, 1 or 2;
each R is, independently, either a hydrogen (—H) or R';
each R' is, independently, either lower alkyl, e.g. methyl, ethyl, propyl, isopropyl and butyl; phenyl(lower) alkyl, e.g. benzyl; allyl or propargyl;
ring A is either unsubstituted or substituted by from 1 to 4 substituents, any one of which is either chloro (—Cl); fluoro (—F); bromo (—Br); hydroxy (—OH); lower alkoxy, e.g. methoxy, ethoxy, propoxy, isopropoxy and butoxy; lower alkyl, e.g. methyl, ethyl, propyl, isopropyl and butyl; or, taken together with its counterpart on an adjacent carbon atom, methylenedioxy (—O—CH$_2$—O—);
ring B is either unsubstituted or substituted by at most three substituents (in the m- and/or p-positions), any one of which is either chloro (—Cl); fluoro (—F); bromo (—Br); lower alkyl, e.g. methyl, ethyl, propyl, isopropyl and butyl; lower alkoxy, e.g. methoxy, ethoxy, propoxy, isopropoxy and butoxy; trifluoromethyl (—CF$_3$); cycloalkyl having from 5 to 7 carbon atoms, e.g. cyclopentyl, cyclohexyl and cycloheptyl; phenyl; or, taken together with its adjacent counterpart, methylenedioxy (—O—CH$_2$—O—); with the proviso that trifluoromethyl, cycloalkyl, phenyl and tertiary butyl groups, or any combination thereof, are not bound to adjacent carbon atoms;
(b) pharmaceutically acceptable acid addition salts thereof, (c) novel steps in the preparation of compounds I and (d) intermediates in the preparation of compounds I.

Compounds I include three classes of compounds:

Ia          Ib          Ic which are prepared by the same procedures. Compounds Ia are those wherein $n$ is 0; compounds Ib, $n$ is 1; and compounds Ic, $n$ is 2. In addition, Ring C can have a lower alkyl, e.g. methyl and ethyl, substituent in the 2-position.

Compounds I' are compounds I wherein both R's are hydrogen atoms; they are prepared from the corresponding compound II by any of the following routes:

$$\text{II} \xrightarrow[\text{4 days}]{\text{LAH, THF/ether}} \text{I'} \quad (A)$$

$$\text{II} \xrightarrow[\text{reflux}]{\text{LAH, THF/ether}} \xrightarrow[\substack{\text{(or) Na, BuOH} \\ \text{(or) Al (Hg)}}]{\text{LAH, THF/ether}} \text{I'} \quad (B)$$

$$\text{II} \longrightarrow \text{III} \xrightarrow{\text{Zn, Ac}_2\text{O}} \text{IV} \xrightarrow[\text{reflux}]{\text{KOH/EtOH}} \text{I'} \quad (C)$$

Reaction A is suitable when there are no halo substituents on either ring A or ring B. Under these circumstances compounds I' are prepared directly from the corresponding compound II by refluxing the latter (with stirring) for about four days with lithium aluminum hydride (LAH) in a solvent system. The solvent is, preferably, an ether, e.g. tetrahydrofuran (THF), diethylether (Et$_2$O), dibutylether and dioxane, or a mixture of such ethers.

The corresponding compound III (Reaction B) is actually an intermediate in reaction A. However, when the refluxing for reaction A is terminated prior to the formation of the corresponding compound I', the corresponding compound III (irrespective of the nature of any of the substituents) is obtained and is isolatable. To prepare a compound I' from the corresponding compound III, the same solvent system and reaction conditions can be continued, but halo substituents may be lost by this procedure. Alternatively, a sodium butanol (Na, BuOH) reduction in the same solvent system is conducted at 80°±5° C. with stirring. (This method, also, is not feasible when halo substituents are to be retained.) However, halo substituents can be retained by refluxing the compound III in a suitable solvent, e.g. THF, with amalgamated aluminum [Al(Hg)] foil for a short period of time, e.g. about a half hour. Reaction C is an alternative method, irrespective of the nature of individual substituents, of preparing compounds I'. According to reaction C a compound III (prepared as, e.g., in reaction B) is maintained in an acetic anhydride (Ac$_2$O) solution in contact with zinc (Zn) at a temperature from 30° to 90° C., followed by treatment, e.g. refluxing, with potassium hydroxide in ethanol.

Compounds II, in turn, are prepared from the corresponding compound V according to either of the following reaction schemes:

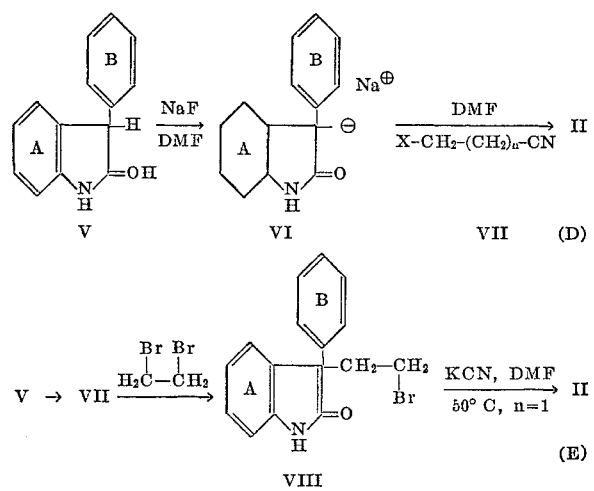

According to reaction scheme D, compound VI is prepared from the corresponding compound V by maintaining the latter in a solvent (with or without stirring) in contact with sodium hydride (NaH) and, preferably, at a temperature of from about 0° to 60° C. A suitable solvent is either dimethylformamide (DMF), dimethylacetamide (DMA), or a mixture of aryl hydrocarbons, e.g., xylenes, with either DMF or DMA.

In the same solvent system and at the same temperature compound II is prepared directly from compound VI by admixing with the thus-prepared compound VI (in situ) a compound VII, wherein X is either chloro or bromo, e.g., chloroacetonitrile and bromoacetonitrile.

According to reaction E compound VIII is prepared from compound VI in the same solvent system and at the same temperature by admixing ethylene bromide with the thus-prepared compound VI. When $n=1$, compound II is, alternatively, prepared from compound VIII in the above-described solvent system at a preferred temperature of about 50° C. and in admixture with either potassium cyanide (KCN) or sodium cyanide (NaCN).

Preferred methods for preparing compounds I' proceed from compounds IX.

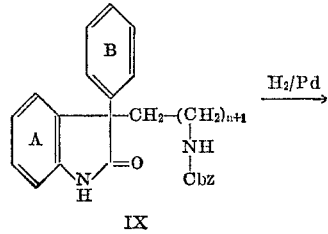

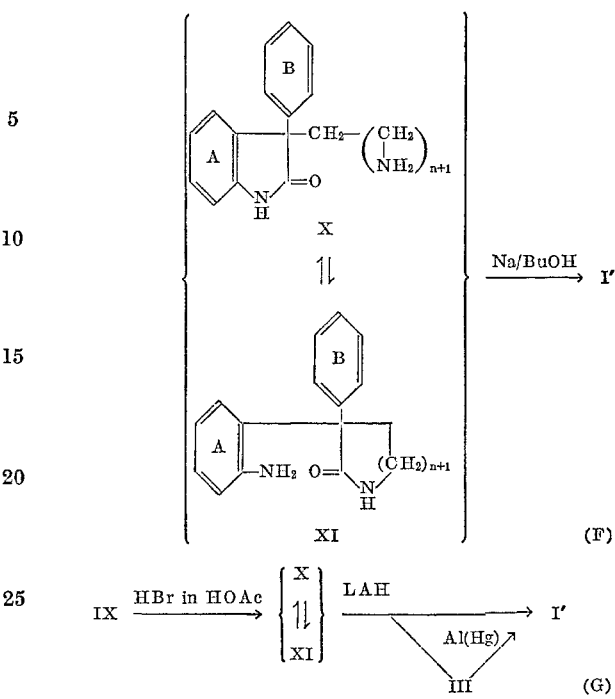

According to reaction F a compound is prepared that corresponds to structure X or its tautomeric analogue XI. (Under varying conditions of pH and solvent either compound X, compound XI or a mixture thereof is obtained.) The first step of reaction F is a reductive cleavage of the carbobenzoxy group (Cbz). This reductive cleavage is effected by hydrogenation in the presence of a noble metal catalyst, such as palladium on carbon. A sodium butanol reduction (second step of reaction F) similar to that discussed with respect to reaction B results in the preparation of a compound I' from the corresponding intermediate.

Unfortunately, reaction F is not suitable for retaining halo substituents, but alternative reaction G can be employed for this purpose. In fact reaction G can be used as a general procedure. Hydrolysis of compound IX is carried out according to reaction G with hydrogen bromide (HBr) in acetic acid (HOAc). (The hydrolysis is followed by decarboxylation as the corresponding reduction in the first step of reaction F.) As from the first step of reaction F a compound is prepared that corresponds to structure X or its tautomeric analogue XI. Reductive cyclization of X and/or XI by LAH leads to a mixture of products (III and I'). Any compound III produced is converted to the corresponding compound I' by treatment of the mixture with aluminum amalgam [Al(Hg)].

The starting material for both reaction F and reaction G is compound IX. This compound is prepared from compound V as follows:

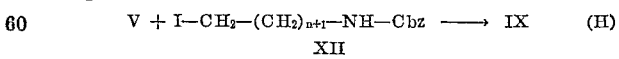

Reaction H is effected with sodium hydride (NaH) in a suitable solvent, e.g., DMF.

Compounds V are either known compounds or they are compounds which are prepared in the same manner as known compounds from corresponding available starting materials, e.g., as disclosed in USP 2,759,935. Likewise, compounds XII are either known or are prepared according to recognized procedures from available starting materials.

Compounds I* are compounds I wherein at least one of the R's is other than a hydrogen atom (—H); compounds I*a are specifically those compounds I* wherein the R in the 1-position is a hydrogen atom; compounds I*b are specifically those compounds I wherein the other R is a hydrogen atom; and compounds I*c are specifically those compounds I wherein each R is an R'.

Compounds I*c are prepared from the corresponding compound I*a according to reaction I

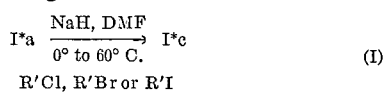

by maintaining the latter in contact with the corresponding R'-halide, e.g., methyl iodide, under the same conditions as are otherwise described for the preparation of compounds VI. Compounds I*a are prepared, e.g., by either of the following routes:

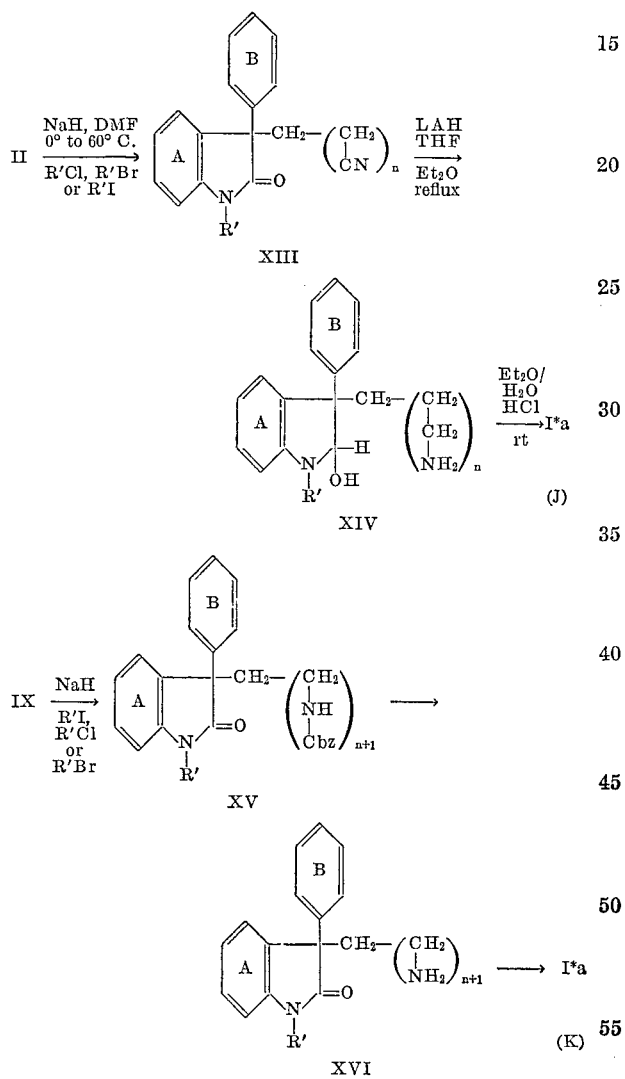

In reaction J compound VIII is prepared from the corresponding compound II by maintaining the latter in contact with an R'-halide, i.e. a chloride, bromide or iodide, under the same conditions as are otherwise described for the preparation of compound VI.

Compound XIV is prepared from the corresponding compound XIII by maintaining the latter under reflux in the same medium as described supra for the preparation of compound III.

Compound I*a (in the form of its hydrochloride) is prepared by maintaining the corresponding compound XIV at room temperature (R.T.), i.e. 20° C., in admixture with diethylether and (aq.) hydrochloric acid. The free base is obtained from its hydrochloride according to standard procedures. Likewise, pharmaceutically acceptable acid addition salts of all compounds I have prepared from corresponding free bases according to established procedures.

Compound XV (reaction K) is prepared from the corresponding compound IX in the same manner as compound XIII is prepared from compound II. The subsequent preparation of compounds XVI and I*a may be analogous to either reaction F or reaction G, depending upon the presence or absence of chloro substituents. In the latter case reaction G should be employed to maintain said substituents.

The preparation of specific compounds I*b is readily accomplished by the lithium aluminum hydride reduction of a corresponding compound IX or XVII.

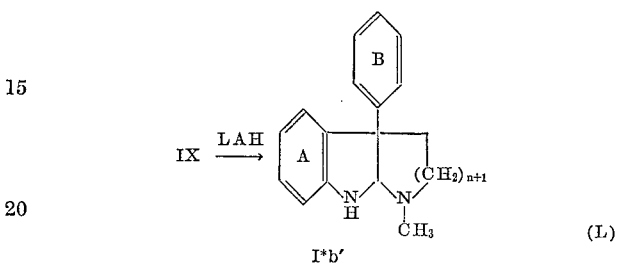

The reduction is effected in the same manner as reaction A.

Compound XVII is prepared in a manner analogous to the preparation of compounds IX (reaction H) from corresponding starting materials

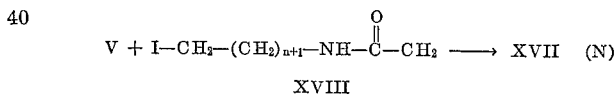

Compounds XII and XVIII are prepared in the following manner:

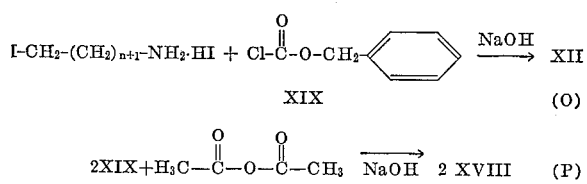

An aqueous solution of sodium hydroxide and carbobenzoxy chloride are added dropwise to an aqueous sodium hydroxide solution of ω-amino(lower)alkyl iodide XIX to obtain the corresponding compound XII (reaction O). Acetic anhydride XXI is employed in place of compound XX to obtain the corresponding compound XVIII (reaction P).

A generic method for preparing compounds I*b is in accord with the following reaction scheme:

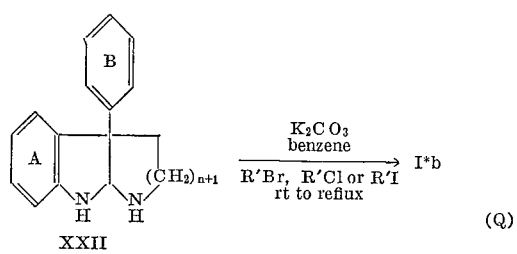

A compound I wherein each R is a hydrogen atom (XXII) is admixed (in a suitable solvent, such as benzene) with an equimolar amount of potassium carbonate and an equimolar amount of R'-halide, e.g. propargyl bromide, benzyl chloride, allyl bromide and ethyl iodide. The temperature is maintained between room temperature and reflux.

Compounds I and their pharmaceutically acceptable acid addition salts are useful as antidepressants, analeptics, hypotensive-antihypertensives and analgesics. They are administered to mammals either orally or parenterally in daily doses of from 0.3 to 3.0 mg./kg. of body weight, e.g. from 30 to 150 milligrams.

Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkylsulfonic acid, such as methylsulfonic acid ($H_3C-SO_3H$); dibasic acids, e.g. succinic acid; tribasic acids, e.g. phosphoric acid and citric acid; saturated acids, e.g. acetic acid; ethylenically unsaturated acds, e.g. maleic acid and fumaric acid; and aromatic acids, e.g. slicyclic acid and arylsulfonic acids, such as phenylsulfonic acid. The only limitation on the acid is that the resulting salt be pharmaceutically acceptable; it is preferred, however, that the acid addition salt be water-soluble.

Each of the pharmaceutically active compounds of this invention may be, e.g. incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and, q.s., 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

| | Parts |
|---|---|
| Title compound of Example 3(d) | 40 |
| Tragacanth | 2 |
| Lactose | 49.5 |
| Corn starch | 5 |
| Talcum | 3 |
| Magnesium stearate | 0.5 |
| Alcohol SD–30 } q.s. | |
| Purified water } | |

Illustrative compounds I (in free base form), which are prepared according to any of the preceding routes which are indicated to be appropriate, are enumerated as follows:

1-allyl-5-ethoxy-6-methyl-3a-(3-butyl-5-chloro-4-isopropoxyphenyl)-1,2,3,3a,8,8a-hexahydropyrrolo[2,3-b]indole;
7-butyl-8-propyl-3a-(4-cyclopentyl-3-propoxyphenyl)-1,2,3,3a,8,8a-hexahydropyrrolo[2,3-b]indole;
8-benzyl-7-ethoxy-6-hydroxy-4-propoxy-1-propyl-3a-(3-ethyl-4-phenylphenyl)-1,2,3,3a,8,8a-hexahydropyrrolo[2,3-b]indole;
5-chloro-6,7-dibutoxy-3a-(4-bromo-3-butyl-5-cyclopentylphenyl)-1,2,3,3a,8,8a-hexahydropyrrolo[2,3-b]indole;
8-allyl-4,5-dipropyl-1-ethyl-3a-(4-methyl-3-phenyl-5-propoxyphenyl)-1,2,3,3a,8,8a-hexahydropyrrolo[2,3-b]indole;
4-bromo-6,7-methylenedioxy-8-propyl-3a-(3-bromo-4-isopropyl-5-trifluoromethylphenyl)-1,2,3,3a,8,8a-hexahydropyrrolo[2,3-b]indole;
5-bromo-1-butyl-7-hydroxy-3a-(3-cycloheptyl-4-ethoxy-5-methylphenyl)-1,2,3,3a,8,8a,-hexahydropyrrolo[2,3-b]indole;
6-ethyl-3a-(4-chloro-5-isopropylphenyl)-1,2,3,3a,8,8a-hexahydropyrrolo[2,3-b]indole;
4a-(4-butoxy-3-fluoro-5-methoxyphenyl)-7-ethyl-5-hydroxy-9-methyl-6-propoxy-2,3,4,4a,9,9a-hexahydro-1H-pyrido[2,3-b]indole;
6-chloro-4a-(4-cyclohexyl-3-isopropoxyphenyl)-8,9-diisopropyl-5-isopropoxy-1-propargyl-2,3,4,4a,9,9a-hexahydro-1H-pyrido[2,3-b]indole;
9-allyl-6,7-methylenedioxy-4a-(4,5-methylenedioxy-3-propylphenyl)-8-propoxy-2,3,4,4a,9,9a-hexahydro-1H-pyrido[2,3-b]indole;
4a-(3-cyclohexyl-5-methoxyphenyl)-1,9-dimethyl-5-methoxy-2,3,4,4a,9,9a-hexahydro-1H-pyrido[2,3-b]indole;
7-bromo-5-butyl-4a-(3-chloro-4-ethyl-5-isopropoxyphenyl)-6-isopropyl-9-propargyl-2,3,4,4a,9,9a-hexahydro-1H-pyrido[2,3-b]indole;
4a-(4-butyl-3-cyclopentylphenyl)-1-isopropyl-8-methoxy-5-methyl-2,3,4,4a,9,9a-hexahydro-1H-pyrido[2,3-b]indole;
4a-(3-ethyl-5-phenyl-4-propoxyphenyl)-5-isopropyl-2,3,4,4a,9,9a-hexahydro-1H-pyrido[2,3-b]indole;
5a-(3-bromo-5-ethoxy-4-trifluoromethylphenyl)-1,10-diethoxy-6,7-methylenedioxy-8-propyl-1,2,3,4,5,5a,10,10a-octahydroazepino[2,3-b]indole;
10-butyl-5a-(3-butoxy-4-cycloheptyl-5-methylphenyl)-6-ethoxy-9-methoxy-1,2,3,4,5,5a,10,10a-octahydroazepino[2,3-b]indole;
5a-(4-fluoro-3-isopropyl-5-trifluoromethylphenyl)-9-isopropoxy-8-methoxy-10-propargyl-1,2,3,4,5,5a,10,10a-octahydroazepino[2,3-b]indole;
10-benzyl-7-butoxy-9-chloro-5a-(3-cycloheptyl-5-ethoxyphenyl)-1,2,3,4,5,5a,10,10a-octahydroazepino[2,3-b]indole;
5a-(3-butoxy-5-fluoro-4-propylphenyl))-7-butyl-10-ethyl-6-fluoro-1-propyl-1,2,3,4,5,5a,10,10a-octahydroazepino[2,3-b]indole;
5a-(3-cyclohexyl-4-methoxyphenyl)-6-ethyl-7-fluoro-1,2,3,4,5,5a,10,10a-octahydroazepino[2,3-b]indole; and
1-benzyl-8-methyl-5a-(3,4-methylenedioxy-5-propylphenyl)-1,2,3,4,5,5a,10,10a-octahydroazepino[2,3-b]indole.

In the examples which follow, the parts and percentages are by weight unless otherwise specified, and the temperatures are in degrees centigrade. The relationship between parts by weight and parts by volume is the same as that between the kilogram and the liter. All reactions are at room temperature and atmospheric pressure unless otherwise stated.

EXAMPLE 1

(a) 3-cyanomethyl-3-phenyloxindole

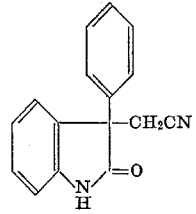

Dissolve (under an atmosphere of nitrogen) 23.8 parts (0.50 mole) of a 50% suspension (in mineral oil) of sodium hydride in several portions in a solution (under stirring) of 99.5 parts (0.40 mole) of 3-phenyloxindole in 770 parts by volume of absolute DMF. Heat the resulting solution at 50° for 3 hours; cool the thus-heated material in an ice bath; admix the cooled product with 39.5 parts (0.53 mole) of chloroacetonitrile; stir the thus-obtained reaction mixture overnight (17 hours) at room temperature; heat the thus-stirred reaction mixture at 60° for 3 hours; and evaporate the resultant in vacuo.

Dilute the obtained residue with 200 parts by volume of diethylether and 200 parts by volume of water. Filter the crystalline product which precipitates, and recrystallize same from methanol to obtain 65 parts of title compound, melting point (M.P.) 174° to 175°.

(b) 3a-phenyl-1,2,3,3a-tetrahydropyrrolo[2,3-b]indole

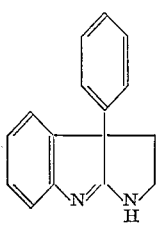

Add a solution of 55.7 parts of (a) in 450 parts by volume of THF dropwise over a period of three hours to a refluxing solution (under stirring) of 17 parts of LAH in 1350 parts by volume of diethylether. After refluxing and stirring the resulting solution for an additional hour, admix therewith an excess (to destroy remaining LAH) of ethyl acetate and water. Filter the thus-produced mixture through Celite and evaporate the filtrate in vacuo. Digest the filter cake with a mixture of chloroform and methanol, filter the product through Celite and evaporate the filtrate in vacuo.

Combine the filtrate residues and triturate same with diethylether. Filter the product to collect the thus-produced crystalline mass. Recrystallize from methanol to obtain 21 parts of (b), M.P. 230°–260°.

(c) 3a-phenyl-1,2,3,3a,8,8a-hexahydropyrrolo-[2,3-b]indole

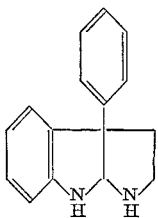

Add 40 parts of sodium (in several portions and over a period of 35 minutes) to a solution (under stirring and at a temperature from 90° to 100°) of 8.0 parts of (b) in 560 parts by volume of n-butanol. After stirring for a total of 45 minutes, cool the resulting reaction mixture to room temperature, and dilute the resultant with water and extract the thus-diluted material with diethylether. Dry the obtained ether solution over sodium sulfate, and then evaporate the thus-dried material under reduced pressure. Crystallize the product from diethylether to obtain 5.9 parts of (c), M.P. 121°–123°. Recrystallize from benzene/diethylether to obtain pure (c), M.P. 122°–124°.

Replacing the chloroacetonitrile in the preparation of (a) with an equivalent of bromoacetonitrile also results in the praparation, in similar manner, of (a). Replacing said chloroacetonitrile with an equivalent of either chloropropionitrile or chlorobutyronitrile results in the preparation, in similar manner, of the corresponding compound V wherein $n$ is 1 or 2, respectively; the resulting compound V is an intermediate for the like preparation of the corresponding compound I.

EXAMPLE 2

(a) 3-cyanomethyl-3-phenyl-5-methoxyoxindole

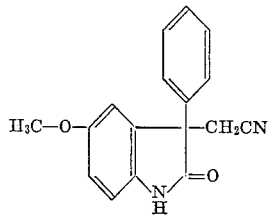

Dissolve (under an atmosphere of nitrogen) 48 parts (1.0 mole) of a 50% suspension (in mineral oil) of sodium hydride in several portions in a solution (under stirring) of 215 parts (0.9 mole) of 3-phenyl-5-methoxyoxindole in 1500 parts by volume of absolute DMF. Heat the resulting solution at 50° to 3 hours; cool the thus-heated material in an ice bath; admix the cooled product with 75 parts (1.0 mole) of chloroacetonitrile; stir the thus-obtained reaction mixture over night (17 hours) at room temperature; heat the thus-stirred reaction mixture at 60° for 3 hours; and evaporate the resultant in vacuo.

Dilute the obtained residue with 400 parts by volume of diethylether and 400 parts by volume of water. Filter the crystalline product which precipitates, and recrystallize same from methanol to obtain 150 parts of title compound, M.P. 158°–160°.

(b) 5-methoxy-3a-phenyl-1,2,3,3a-tetrahydropyrrolo[2,3-b]indole

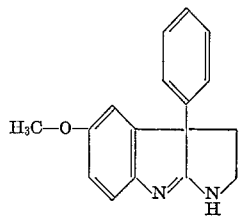

Add a solution of 70 parts of (a) in 450 parts by volume of THF dropwise over a period of 3 hours to a refluxing solution (under stirring) of 23 parts of LAH in 1350 parts by volume of diethylether. After refluxing and stirring the resulting solution for an additional hour, admix therewith an excess (to destroy remaining LAH) of ethyl acetate and water. Filter the thus-produced mixture through Celite and evaporate the filtrate in vacuo. Digest the filter cake with a mixture of chloroform and methanol, filter the product through Celite and evaporate the filtrate in vacuo.

Combine the filtrate residues and triturate same with diethylether. Filter the product to collect the thus-produced crystalline mass. Recrystallize from methanol to obtain 35.5 parts of (b), M.P. 196°–198°.

(c) 5-methoxy-3a-phenyl-1,2,3,3a,8,8a-hexahydropyrrolo[2,3-b]indole

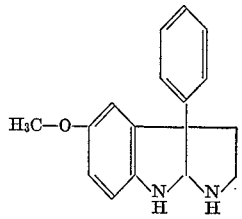

Add 150 parts of sodium (in several portions and over a period of 35 minutes) to a solution (under stirring and a temperature from 90° to 100°) of 30.5 parts of (b) in 2000 parts by volume of n-butanol. After stirring for a total of 45 minutes, cool the resulting reaction mixture to room temperature, dilute the resultant with water and extract the thus-diluted material with diethylether. Dry the obtained ether solution over sodium sulfate, and then evaporate the thus-dried material under reduced pressure. Crystallize the product from diethylether to obtain 16.8 parts of (c), M.P. 98°–100°. Recrystallize from benzene/diethylether to obtain pure (c), M.P. 98°–100°.

Replacing the 3-phenyl-5-methoxyoxindole in the preparation of (a) with an equivalent of either 3-phenyl-6-ethyloxindole, 3-phenyl-5-methoxy-6-methyloxindole or 3-phenyl-5,6-methylenedioxyindole, results in the preparation, in similar manner, of the corresponding compound V which, in turn, is an intermediate (as illustrated supra) for the preparation of the corresponding compound I.

EXAMPLE 3

(a) 5-chloro-3-cyanomethyl-3-phenyloxindole

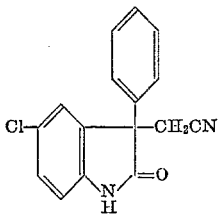

Dissolve (under an atmosphere of nitrogen) 26.6 parts (0.55 mole) of a 50% suspension (in mineral oil) of sodium hydride in several portions in a solution (under stirring) of 130.3 parts (0.54 mole) of 5-chloro-3-phenyloxindole in 770 parts by volume of absolute DMF. Heat the resulting solution at 50° for 3 hours; cool the thus-heated material in an ice bath; admix the cooled product with 44.5 parts (0.68 mole) of chloroacetonitrile; stir the thus-obtained reaction mixture over night (17 hours) at room temperature; heat the thus-stirred reaction mixture at 60° for 3 hours; and evaporate the resultant in vacuo.

Dilute the obtained residue with 200 parts by volume of diethylether and 200 parts by volume of water. Filter the crystalline product which precipitates, and recrystallize same from methanol to obtain 107 parts of title compound, M.P. 211°–213°.

(b) 5-chloro-3a-phenyl-1,2,3,3a-tetrahydropyrrolo[2,3-b]indole

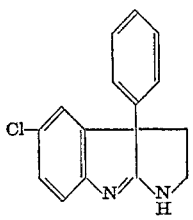

Add a solution of 65 parts of (a) in 450 parts by volume of THF dropwise over a period of 3 hours to a refluxing solution (under stirring) of 18 parts of LAH in 1350 parts by volume of diethylether. After refluxing and stirring the resulting solution for an additional hour, admix therewith an excess (to destroy remaining LAH) of ethyl acetate and water. Filter the thus-produced mixture through Celite and evaporate the filtrate in vacuo. Digest the filter cake with a mixture of chloroform and methanol, filter the product through Celite and evaporate the filtrate in vacuo.

Combine the filtrate residues and triturate same with diethylether. Filter the product to collect the thus-produced crystalline mass. Recrystallize from methanol to obtain 24.3 parts of (b), MP. 184°–187°.

(c) 5-chloro-1,8-diacetyl-3a-phenyl-1,2,3,3a,8,8a-hexahydropyrrolo[2,3-b]indole

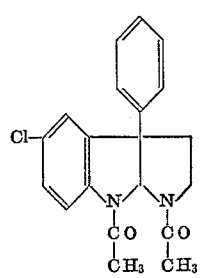

Admix 16 parts of zinc dust with a solution (under stirring and at 60°) of 4.0 parts of (b) in 75 parts by volume of acetic anhydride. After maintaining the stated temperature for 1 hour, filter the obtained reaction mixture. Wash the filter cake with acetic anhydride and benzene, and concentrate the filtrate and washings in vacuo.

Maintain the resulting concentrate undisturbed over night. Thereafter admix said concentrate first with methanol and then with water.

Filter the crystalline powder which precipitates, and recrystallize same from methanol to obtain 3.5 parts of (c), M.P. 166°–167°.

(d) 5-chloro-3a-phenyl-1,2,3,3a,8,8a-hexahydropyrrolo[2,3-b]indole

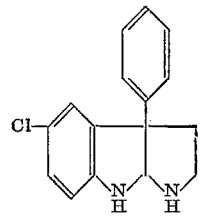

Reflux for 30 hours a mixture of 9.4 parts of (c), 20 parts of potassium hydroxide, 20 parts by volume of water and 140 parts by volume of ethanol. Filter the thus-obtained reaction mixture, dilute the filtrate with water and extract the diluted product with diethylether. Dry the ether phase over sodium sulfate before evaporating same in vacuo to obtain an oil. Crystallize the oil from diethylether to obtain 4.5 parts of (d). Recrystallize same from benzene/diethylether to obtain pure (d), M.P. 130°–132°.

Replacing the 5-chloro-3-phenyloxindole in the preparation of (a) with an equivalent of either 5-bromo-3-phenyloxindole, 5 - methyl - 6-methoxy-3-phenyloxindole, 3-(3,5-dibromophenyl)-oxindole or 5,6 - dichloro - 3(4-fluorophenyl)-oxindole, results in the preparation, in similar manner, of the corresponding compound V which, in turn, is an intermediate (in the instantly-described procedure) for the preparation of the corresponding compound I.

EXAMPLE 4

(a) 3-cyanomethyl-1-methyl-3-phenyloxindole

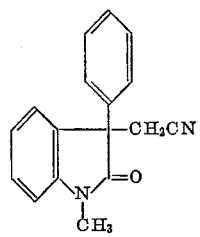

Dissolve (in several portions) 6.0 parts (0.125 mole) of a 54% suspension (in mineral oil) of sodium hydride in a solution (under stirring and under an atmosphere of nitrogen) of 25 parts (0.10 mole) of 3-cyanomethyl-3-phenyloxindole in 200 parts by volume of absolute DMF. Heat the resulting solution at 50° for 2 hours, cool the product in an ice bath, and then admix the cooled product with 21.3 parts (0.15 mole) of methyl iodide. Stir the thus-obtained reaction mixture at room temperature over night and then heat for 1 hour at 50° before evaporating same under reduced pressure. Crystallize the thus-produced residue from methanol/water to obtain 23 parts of (a), M.P. 131°–133°.

(b) 3-(2-aminoethyl)-2-hydroxy-1-methyl-3-phenylindoline

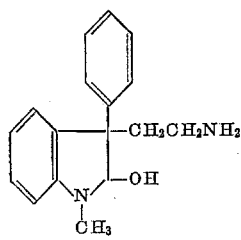

Add dropwise over a period of 1 hour a solution of 17.6 parts of (a) in 370 parts by volume of THF to a refluxing solution (under stirring) of 8.5 parts of LAH in 500 parts by volume of diethylether. Stir (without heating) the thus-refluxed material for an additional half hour before adding thereto excess (to destroy remaining LAH) ethyl acetate and water.

Filter the thus-obtained reaction mixture through Celite, and concentrate the filtrate in vacuo. Crystallize the residue from diethylether to obtain 7.6 parts of pure (b), M.P. 121°–123°.

(c) 8-methyl-3a-phenyl-1,2,3,3a,8,8a-hexahydro-pyrrolo[2,3-b]indole hydrochloride.

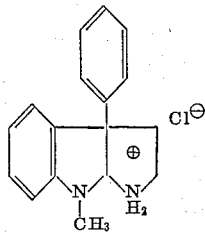

Admix 10 parts by volume of 0.8 N (aq.) hydrochloric acid with a suspension (under stirring) of 1.0 part of (b) in 10 parts by volume of diethylether. The solids dissolve and, after about five minutes, crystals appear. Cool the obtained mixture to 0°. Filter the cooled product and wash the filter cake with 0.8 N hydrochloric acid and diethylether. There are thus obtained 0.71 part of (c). Recrystallize same from water to obtain pure (c), M.P. 238°–240°.

(d) 1,8-dimethyl-3a-phenyl-1,2,3,3a,8,8a-hexahydro-pyrrolo[2,3-b]indole hydrochloride

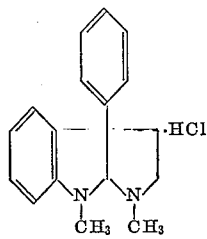

Admix with 2.59 parts (0.024 mole) of ethyl chloroformate a stirred solution of 3.42 parts (0.012 mole) of (c) in a mixture of 18 parts by volume of THF, 72 parts by volume of chloroform, 36 parts by volume of water and 18 parts by volume of 2 N sodium hydroxide solution. Cool the resultant mixture to 0° and stir for two hours; maintain same at room temperature over night. Dilute the reaction mixture with water and extract same with chloroform. Dry the chloroform extract over sodium sulfate and evaporate in vacuo. Add dropwise (over a period of 15 minutes) to 1.5 parts of LAH in diethylether a solution of the oily residue in ether. Heat the thus-obtained reaction mixture under reflux over night. Add thereto excess (to destroy remaining LAH) ethyl acetate and water.

Filter the thus-obtained reaction mixture through Celite. Evaporate the filtrate under reduced pressure to obtain an oily residue. The oily residue is converted to a crystalline hydrochloride salt by standard procedures. Recrystallize same from acetone to obtain 2.4 parts of the pure salt M.P. 208°–209°.

Replacing the methyl iodide in the preparation of (a) with an equivalent of either ethyl bromide or propyl chloride results in the preparation of the corresponding compound VII which, in turn, is an intermediate for the similar preparation of the corresponding compound I.

EXAMPLE 5

5-chloro-3-cyanomethyl-1-methyl-3-phenyloxindole

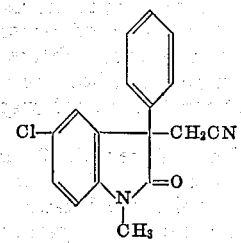

Dissolve (in several portions) 1.2 parts (0.025 mole) of a 50% suspension (in mineral oil) of sodium hydride in a solution (under stirring and under an atmosphere of nitrogen) of 5.7 parts (0.02 mole) of 5-chloro-3-cyanomethyl-3-phenyloxindole in 40 parts by volume of abolute DMF. Heat the resulting solution at 50° for two hours, cool the product in an ice bath, and then admix the cooled product with 4.3 parts (0.03 mole) of methyl iodide. Stir the thus-obtained reaction mixture at room temperature over night and then heat for 1 hour at 50° before evaporating same under reduced pressure. Crystallize the thus-produced residue from methanol/water to obtained 5.0 parts of the title compound, M.P. 169°–173°.

Replacing the methyl iodide with an equivalent of benzyl chloride results in the preparation, in similar manner, of 5-chloro-3-cyanomethyl-1-benzyl-3-phenyloxindole.

EXAMPLE 6

5-methyl-3-cyanomethyl-1-methyl-3-phenyloxindole

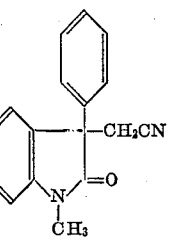

Dissolve (in several portions) 14.4 parts (0.30 mole) of a 50% suspension (in mineral oil) of sodium hydride in a solution (under stirring and under an atmosphere of nitrogen) of 60 parts (0.22 mole) of 3-cyanomethyl-5-methoxy-phenyloxindole in 500 parts by volume of absolute DMF. Heat the resulting solution at 50° for two hours, cool the product in an ice bath, and then admix the cooled product with 51.0 parts (0.36 mole) of methyl iodide. Stir the thus-obtained reaction mixture at room temperature over night and then heat for 1 hour at 50° before evaporating same under reduced pressure. Crystallize the thus-produced residue from methanol/water to obtained 40.8 parts of title compound, M.P. 134°–136°.

EXAMPLE 7

5-chloro-3-(2-cyanoethyl)-3-phenyloxindole

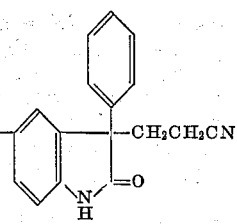

Dissolve (under an atmosphere of nitrogen) 1.25 parts (0.025 mole) of a 50% suspension (in mineral oil) of sodium hydride in several portions in a solution (under stirring) of 6.1 parts (0.025 mole) of 5-chloro-3-phenyloxindole in 40 parts by volume of absolute DMF. Heat the resulting solution at 50° for 3 hours; cool the thus-heated material in an ice bath; admix the cooled product with 3.7 parts (0.028 mole) of 3-bromo-propionitrile; stir the thus-obtained reaction mixture over night (17 hours) at room temperature; heat the thus-stirred reaction mixture at 60° for 3 hours; and evaporate the resultant in vacuo.

Dilute the obtained residue with 10 parts by volume of diethylether and 10 parts by volume of water. Filter the crystalline product which precipitates, and recrystallize same from methanol to obtain 1.0 part of title compound, M.P. 146°–148°.

EXAMPLE 8

3-(2-bromoethyl)-5-chloro-3-phenyloxindole

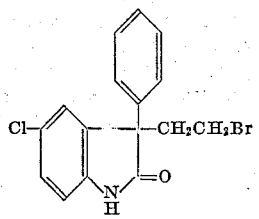

Dissolve (under an atmosphere of nitrogen) 1.87 parts (0.040 mole) of a 50% suspension (in mineral oil) of sodium hydride in several portions in a solution (under stirring) of 9.15 parts (0.038 mole) of 5-chloro-3-phenyloxindole in 60 parts by volume of absolute DMF. Heat the resulting solution at 50° for 3 hours; cool the thus-heated material in an ice bath; admix the cooled product with 8.4 parts (0.045 mole) of 1,2-dibromoethane; stir the thus-obtained reaction mixture over night (17 hours) at room temperature; heat the thus-stirred reaction mixture at 60° for 3 hours; and evaporate the resultant in vacuo.

Dilute the obtained residue with 15 parts by volume of diethylether and 15 parts by volume of water. Filter the crystalline product which precipitates, and recrystallize same from methanol to obtain 6.4 parts of title compound, M.P. 162°–164°.

EXAMPLE 9

5-chloro-3a-phenyl-1,2,3,3a,8,8a-hexahydropyrrolo[2,3-b]indole

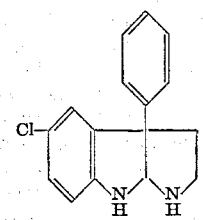

Add amalgamated aluminum foil to a solution of 1 part of 5 - chloro-3a-phenyl-1,2,3,3a-tetrahydropyrrolo[2,3-b]indole (title compound of Example 3b) in 100 parts by volume of THF and 3 parts by volume of water. Reflux the obtained mixture for thirty minutes and then filter same. Evaporate the filtrate in vacuo, and crystallize the residue from diethylether to obtain the title compound, M.P. 129°–131°.

Replacing the title compound of Example 3b with an equivalent of either 4-chloro-, 6-chloro- or 7-chloro-3a-phenyl-1,2,3,3a-tetrahydropyrrolo[2,3-b]indole results in the preparation, in similar manner, of 4-chloro-, 6-chloro- or 7 - chloro-3a-phenyl-1,2,3,3a,8,8a-hexahydropyrrolo[2,3-b]indole, respectively.

EXAMPLE 10

(a) 5-chloro-3-p-chlorophenyl-3-cyanomethyloxindole

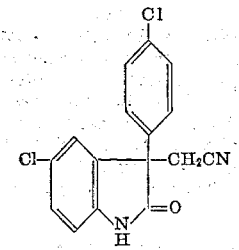

Dissolve (under an atmosphere of nitrogen) 26.6 parts (0.55 mole) of a 50% suspension (in mineral oil) of sodium hydride in several portions in a solution (under stirring) of 151 parts (0.54 mole) of 5-chloro-3-p-chlorophenyloxindole in 770 parts by volume of absolute DMF. Heat the resulting solution at 50° for 3 hours; cool the thus-heated material in an ice bath; admix the cooled product with 44.5 parts (0.68 mole) of chloroacetonitrile; stir the thus-obtained reaction mixture over night at room temperature; heat the thus-stirred reaction mixture at 60° for 3 hours; and evaporate the resultant in vacuo.

Dilute the obtained residue with 200 parts by volume of diethylether and 200 parts by volume of water. Filter the crystalline product which precipitates, and recrystallize same from methanol to obtain (a).

(b) 5-chloro-3a-p-chloro-phenyl-1,2,3,3a-tetrahydropyrrolo[2,3-b]indole

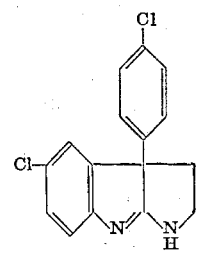

Add a solution of 73 parts of (a) in 450 parts by volume of THF dropwise over a period of three hours to a refluxing solution (under stirring) of 18 parts of LAH in 1350 parts by volume of diethylether. After refluxing and stirring the resulting solution for an additional hour, admix therewith an excess (to destroy remaining LAH) of ethyl acetate and water. Filter the thus-produced mixture through Celite and evaporate the filtrate in vacuo. Digest the filter cake with a mixture of chloroform and methanol, filter the product through Celite and evaporate the filtrate in vacuo.

Combine the filtrate residues and triturate same with diethylether. Filter the product to collect the thus-produced crystalline mass. Recrystallize from methanol to obtain (b).

(c) 5-chloro-3a-p-chlorophenyl-1,2,3,3a,8,8a-hexahydropyrrolo[2,3-b]indole

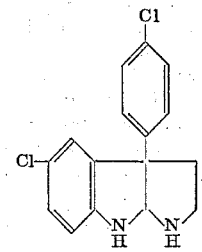

Add amalgamated aluminum foil to a solution of 1.1 parts of (b) in 100 parts by volume of THF and three parts by volume of water. Reflux the obtained mixture for thirty minutes and then filter same. Evaporate the filtrate in vacuo, and crystallize the residue from diethylether to obtain (c), M.P. 110°–112°.

Replacing the 5-chloro-3-p-chlorophenyloxindole (step a) with an equivalent of either 5-methyl-, 5-methoxy- or 5-hydroxy-3-p-chlorophenyloxindole results in the preparation, in similar manner, of 5-methyl-, 5-methoxy- or 5-hydroxy-3a-p-chlorophenyl - 1,2,3,3a,8,8a - hexahydropyrrolo[2,3-b]indole, respectively.

EXAMPLE 11

(a) 3-(2-N-carbobenzoxyaminoethyl)-3-phenyloxindole

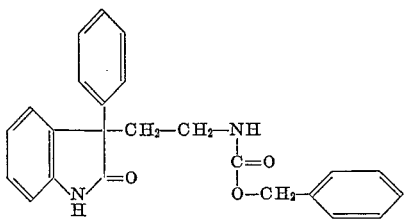

Dissolve (under an atmosphere of nitrogen) 3.0 parts of a 50% suspension (in mineral oil) of sodium hydride in several portions in a solution (under stirring) of 12.0 parts of 3-phenyloxindole in 120 parts by volume of absolute DMF. Heat the resulting solution at 50° for 3 hours; cool the thus-heated material in an ice bath; admix the resultant with 18.0 parts of 2-N-carbobenzoxyaminoethyl iodide; stir the thus-obtained reaction mixture over night at room temperature before heating same at 60° for three hours. Evaporate the resultant in vacuo.

Dissolve the obtained residue with 20 parts by volume of diethylether and 40 parts by volume of water. Filter the crystalline product which precipitates, and recrystallize same from methanol to obtain (a), M.P. 148°–150°.

(b) 1-methyl-3a-phenyl-1,2,3,3a,8,8a-hexahydropyrrolo[2,3-b]indole bimaleate

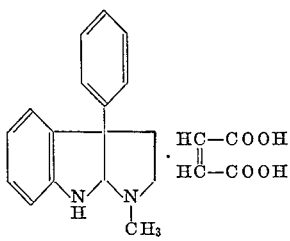

Admix a solution of 11 parts of (a) in 70 parts by volume of THF with a solution of 4.0 parts of LAH in 150 parts by volume of diethylether and reflux the resultant for seventeen hours. Cool the resulting reaction mixture, and then decompose the remaining LAH by adding 20 parts by volume of water thereto. Filter the obtained mixture through Celite, and evaporate the filtrate in vacuo.

Admix 4.6 parts of maleic acid with the residue, and crystallize the product from ethanol/diethylether to obtain (b), M.P. 160°–161°.

Replacing the 3-phenyloxindole (step a) with an equivalent of either 4,5-methylenedioxy- or 5,6-methylenedioxy-3-phenyloxindole results in the preparation, in similar manner, of 1-methyl-4,5-methylenedioxy-3a-phenyl-1,2,3,3a,8,8a-hexahydropyrrolo[2,3-b]indole bimaleate or 1-methyl-5,6-methylenedioxy - 3a - phenyl-1,2,3,3a,8,8a-hexahydropyrrolo[2,3-b]indole bimaleate, respectively.

(c) 3-(2-aminoethyl)-3-phenyloxindole hydrochloride

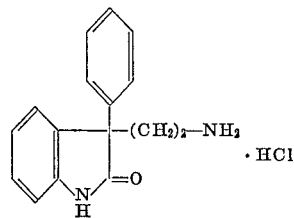

Shake for 18 hours under 50 pounds of hydrogen a solution of 64 parts of (a) in 500 parts by volume of ethanol containing 6 parts of 10% palladium-on-carbon catalyst. Then filter off the catalyst and evaporate the filtrate in vacuo. Dissolve the thus-obtained residue in 60 parts by volume of 10% (aq) hydrochloric acid, and cool the resulting solution to 0° to precipitate the crude title compound. Crystallize from methanol to obtain title compound (c), M.P. 243°–249° (dec.).

The free base of (c) is obtained from the hydrochloride according to well-established standard procedures.

(d) 3-[2-(1-methyl-2-phenylethylamino)ethyl]-3-phenyloxindole hydrochloride

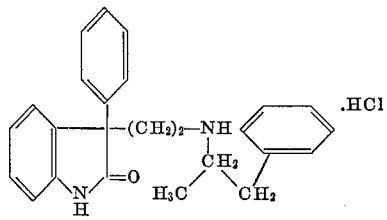

Shake under 50 pounds of hydrogen for 65 hours a mixture of 25 parts of the free base of (c), 40 parts of phenyl-2-propanone, 3 parts of platinum oxide and 225 parts by volume of ethanol. Then filter off the catalyst and evaporate the filtrate in vacuo. Dissolve the obtained residue in methanol and saturate the resulting solution with hydrogen chloride gas. Dilute the resultant with diethylether to obtain the title compound, M.P. 242°–245° (dec.).

The free base of (d) is obtained from the hydrochloride according to well-established standard procedures.

(e) 1-(1-methyl-2-phenylethyl)-3a-phenyl-1,2,3,3a,8,8a-hexahydropyrrolo[2,3-b]indole bimaleate

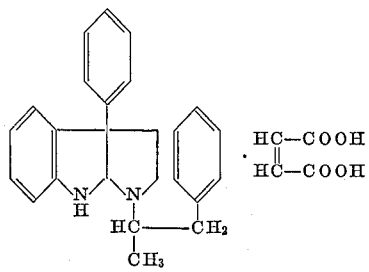

To a solution of 4.5 parts parts of LAH in 400 parts by volume of diethylether add a solution of 12.9 parts of the free base of (d) in 100 parts by volume of THF and 100 parts by volume of diethylether. Reflux the resulting mixture of 15 hours. Then add thereto 25 parts by volume of water before filtering through Celite. Evaporate the filtrate. Dissolve the obtained residue in 13 parts by volume of ethanol and 60 parts by volume of diethylether. Add the resulting solution to a solution of 4.2 parts of maleic acid in 10 parts by volume of ethanol. Filter the precipitated crystals of the title compound, M.P. 162°–164° (dec.).

EXAMPLE 12

(a) 3-(2-N-carbobenzoxyaminoethyl)-5-chloro-3-phenyloxindole

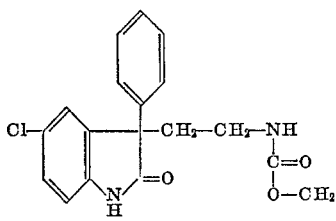

Dissolve (under an atmosphere of nitrogen) 9.8 parts of a 50% suspension (in mineral oil) of sodium hydride in several portions in a solution (under stirring) of 42.7 parts of 5-chloro-3-phenyloxindole in 300 parts by volume of absolute DMF. Heat the resulting solution at 50° for 3 hours; cool the thus-heated material in an ice bath; admix the resultant with 59.5 parts of 2-N-carbobenzoxy-aminoethyl iodide; stir the thus-obtained reaction mixture for 17 hours at room temperature before heating same at 60° for three hours. Evaporate the resultant in vacuo.

Dissolve the obtained residue in 50 parts by volume of diethylether and 160 parts by volume of water. Filter the crystalline product which precipitates, and recrystallize same from methanol to obtain (a), M.P. 166°–168°.

(b) 5-chloro-1-methyl-3a-phenyl-1,2,3,3a,-8,8a-hexahydropyrrolo[2,3-b]-indole hydrochloride

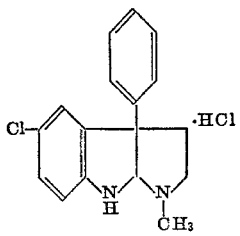

Add a solution of 15 parts of 5-chloro-3-(2-N-carbobenzoxyaminoethyl)-3-phenyloxindole in 125 parts by volume of THF to a solution of 5.0 parts of LAH in 175 parts by volume of diethylether and reflux the resulting reaction mixture for seventeen hours. Then cool the reaction mixture and decompose same by admixing 20 parts by volume of water therewith. Filter the resultant through Cele and evaporate the filtrate in vacuo.

Dissolve the residue in diethylether. Pass dry hydrogen chloride gas through the obtained solution. Filter the formed precipitate and crystallize same from methanol/acetone to obtain (b), M.P. 231°–233°.

Replacing the 5-chloro-3-phenyloxindole (step a) with an equivalent of either 5-chloro-6-methyl- or 6-methyl-3-phenyloxindole results in the preparation, in similar manner, of 5-chloro-1,6-dimethyl- or 1,6-methyl-3a- phenyl-1,2,3,4a,8,8a-hexahydropyrrolo[2,3-b]indole hydrochloride, respectively.

EXAMPLE 13

(a) 2-(N-carbobenzoxyamino)ethyl iodide

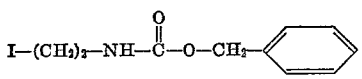

Dissolve 376 parts of 2-aminoethyl iodide hydroiodide in a solution of 40 parts of NaOH in 600 parts by volume of water. Cool the obtained solution in an ice bath. With stirring add dropwise and simultaneously 171 parts of carbobenzoxy chloride and a solution of 40 parts of NaOH in 360 parts by volume of water to the aminoethyl iodide solution (over a period of thirty-five minutes).

When precipitate stops forming, filter same and recrystallize from ditthylethir-pentane to obtain (a), M. . 65°–67°.

(b) 3-(2-N-carbobenzoxyaminoethyl)-5-methoxy-3-phenyloxindole

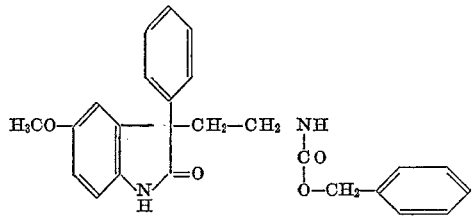

Dissolve (under on atmosphere of nitrogen) 10.6 parts of a 50% suspension (in mineral oil) of sodium hydride in several portions in a solution (under stirring) of 48 parts of 5-methoxy-3-phenyloxindole in 420 parts by volume of DMF. Heat the resulting solution at 50° for 3 hours; cool the thus-heated material in an ice bath; admix the resultant with 18.0 parts of (a); stir the thus-obtained reaction mixture for 17 hours at room temperature before heating same at 60° for three hours. Evaporate the resultant in vacuo.

Dissolve the residue in a mixture of diethylether and water. Separate the ether layer and dry same over Na₂SO₄. Evaporate the dried ether layer in vacuo to obtain the product (b) as a syrup.

(c) 5-methoxy-1-methyl-3a-phenyl-1,2,3,3a,8,8a-hexahydropyrrolo[2,3-b]indole hydrochloride

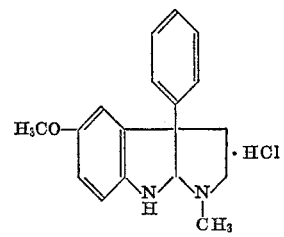

Add a solution fo 20 pots of (b) in 50 parts by volume of THF to a solution of 10 parts of LAH in 400 parts by volume of diethylether and reflux the resulting reaction mixture for seventeen hours. Then cool the reaction mixture and decompose same by admixing 40 parts by volume of water therewith. Filter the resultant through Celite and evaporate the filtrate in vacuo.

Dissolve the residue in diethylether. Pass dry hydrogen chloride gas through the obtained solution. Filter the formed precipitate and crystallize same from methanol/acetone to obtain (c), M.P. 213°–215°.

Replacing the 2-ominoethyl iodide hydroiodide (step a) with an equivalent of either 3-aminopropyl iodide hydroiodide or 4-aminobutyl iodide hydroiodide results in the preparation, in similar manner, of either 6-methoxy - 1 - methyl-4a-phenyl-2,3,4,4a,9,9a-hexahydro-1H-pyrido[2,3-b]indole hydrochloride or 7-methoxy-1-methyl - 5a-phenyl-1,2,3,4,5,5a,10,10a-octahydroazepino[2,3-b]-indole hydrochloride respectively.

EXAMPLE 14

(a) 3-(3-N-carbobenzoxyaminopropyl)-3-phenyloxindole

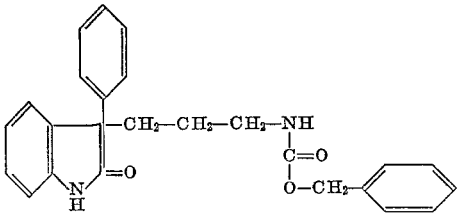

Dissolve (under at atmosphere of nitrogen) 14.2 parts of a 50% suspension (in mineral oil) of sodium hydride in several portions in a solution (under stirring) of 57 parts of 3-phenyloxindole in 540 parts of DMF. Heat the resulting solution at 50° for three hours; cool the thus-treated material in an ice bath; admix the resultant with 90 parts of 3-N-carbobenzoxyaminopropyl iodide; stir the thus-obtained reaction mixture for seventeen hours at room temperature before heating same at 60° for three hours. Evaporate the resultant in vacuo.

Dissolve the obtained residue in 100 parts by volume of diethylether and 240 parts by volume of water. Filter the crystalline product which precipitates, and recrystallize same from methanol to obtain (a), M.P. 164°–166°.

(b) 1-methyl-4a-phenyl-2,3,4,4a,9,9a-hexahydro-1H-pyrido[2,3-b]indole hydrochloride

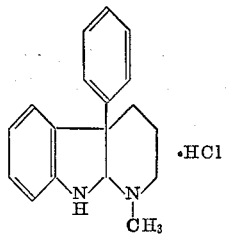

Add a solution of 20 parts of (a) in 300 parts by volume of THF to a solution of 7 parts of LAH in 200 parts by volume of diethylether and reflux the resulting reaction mixture for seventeen hours. Then cool the reaction mixture and decompose same by admixing 30 parts by volume of water therewith. Filter the resultant through Celite and evaporate the filtrate in vacuo.

Dissolve the residue in diethylether. Pass dry hydrogen chloride gas through the obtained solution. Filter the formed precipitate and crystallize same from methanol/acetone to obtain (b), M.P. 120°–122°.

Replacing the 3-phenyloxindole (step a) with an equivalent of either 4-chloro- or 6-chloro-3-phenyloxindole results in the preparation, in similar manner, of 5-chloro- or 7-chloro-1-methyl-4a-phenyl-2,3,4,4a,9,9a - hexahydro-1H-pyrido[2,3-b]indole hydrochloride respectively.

EXAMPLE 15

(a) 3-N-carbobenzoxyaminopropyl iodide

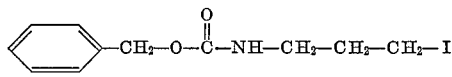

Dissolve 31.3 parts of 3-aminopropyl iodide hydroiodide in a solution of 4.0 parts of sodium hydroxide (NaOH) in 60 parts by volume of water. Cool the obtained solution in an ice bath. With stirring add dropwise and simultaneously 17.0 parts of carbobenzoxy chloride and a solution of 4.0 parts of NaOH in 30 parts by volume of water to the initially prepared aminopropyl iodide solution (over a period of thirty-five minutes).

Stir the resultant for one hour, and then extract same with three 100-part-by-volume portions of diethylether. Dry the combined extracts over sodium sulfate (Na$_2$SO$_4$), and then evaporate them to obtain (a) as an oil.

(b) 3-(3-N-carbobenzoxyaminopropyl)-5-chloro-3-phenyloxindole

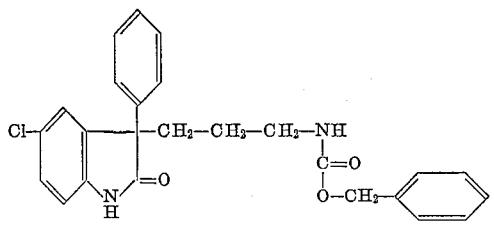

Dissolve (under an atmosphere of nitrogen) 13.0 parts of a 50% suspension (in mineral oil) of sodium hydride in several portions in a solution (under stirring) of 60 parts of 5-chloro-3-phenyloxindole in 550 parts by volume of DMF. Heat the resulting solution at 50° for three hours; cool the thus-treated material in an ice bath; admix the resultant with 88 parts of 3-N-carbobenzoxyaminopropyl iodide; stir the thus-obtained reaction mixture for seventeen hours at room temperature before heating same at 60° for three hours. Evaporate the resultant in vacuo.

Dissolve the obtained residue in 100 parts by volume of diethylether and 240 parts by volume of water. Filter the crystalline product which precipitates, and recrystallize same from diethylether to obtain (b), M.P. 178°–183°.

(c) 6-chloro-1-methyl-4a-phenyl-2,3,4,4a,9,9a-hexahydro-1H-pyrido[2,3-b]indole hydrochloride

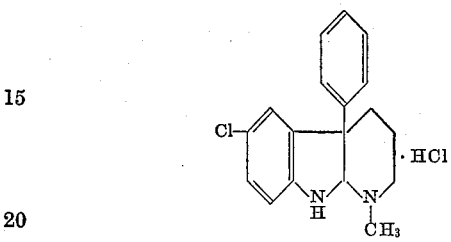

Add a solution of 10 parts of (b) in 60 parts by volume of THF to a solution of 4.0 parts of LAH in 100 parts by volume of diethylether and reflux the resulting reaction mixture for seventeen hours. Then cool the reaction mixture and decompose same by admixing 15 parts by volume of water therewith. Filter the resultant through Celite and evaporate the filtrate in vacuo.

Dissolve the residue in diethylether. Pass dry hydrogen chloride gas through the obtained solution. Filter the formed precipitate and crystallize same from methanol to obtain (c), M.P. 146°–156°.

Replacing the 5-chloro-3-phenyloxindole (step b) with an equivalent of either 5-fluoro-, 5-bromo- or 5-hydroxy-3-phenyloxindole results in the preparation, in similar manner, of 6-fluoro-, 6-bromo- or 6-hydroxy-1-methyl-4a-phenyl - 2,3,4,4a,9,9a - hexahydro - 1H - pyrido[2,3 - b] indole hydrochloride, respectively.

EXAMPLE 16

(a) 3-(3-aminopropyl)-3-phenyloxindole hydrochloride

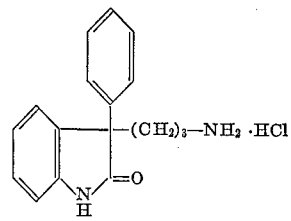

Dissolve 40 parts of 3-(3-N-carbobenzoxyaminopropyl)-3-phenyloxindole in 225 parts by volume of ethanol containing 4 parts of 10% palladium on carbon (Pd/C) catalyst. Shake the resultant in an atmosphere of hydrogen (50 p.s.i.g.) for 24 hours. Then filter off the catalyst and evaporate the filtrate. Dissolve the obtained residue in a mixture of 60 parts by volume of diethylether and 120 parts by volume of 10% (aq.) hydrochloric acid. Wash the hydrochloric acid phase with 40 parts by volume of diethylether, and then cool same to form a precipitate. Crystallize the precipitate from water to obtain (a), M.P. 282°–284°.

(b) 4a-phenyl-2,3,4,4a,9,9a-hexahydro-1H-pyrido[2,3-b]indole bimaleate

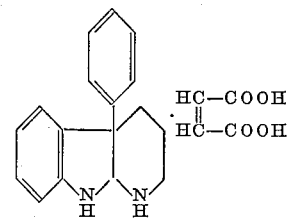

Admix (over a period of thirty minutes and at 90°) 40 parts of sodium (in several portions) with 8.0 parts of (a) in 700 parts by volume of n-butanol. Heat the resulting solution for one additional hour at 90°, then cool and pour into 1400 parts by volume of water.

Wash the water layer with diethylether. Combine the ether and butanol extracts and dry same over Na$_2$SO$_4$; evaporate the dried combined extracts.

Admix the residue with 3.2 parts of maleic acid, and crystallize the formed solid from ethanol/diethylether to obtain (b), M.P. 156°–158°.

Replacing the 3-(3-N-carbobenzoxyaminopropyl)-3-phenyloxindole (step a) with an equivalent of either 3 - (3 - N - carbobenzoxyaminopropyl) - 3 - p - tolyloxindole or 3-(3-N-carbobenzoxyaminopropyl)-3-(3,5-dimethoxyphenyl)oxindole results in the preparation, in similar manner, of 4a-p-tolyl-2,3,4,4a,9,9a-hexahydro-1H-pyrido[2,3-b]indole bimaleate or 4a-(3,5-dimethoxyphenyl) - 2,3,4,4a,9,9a - hexahydro - 1H - pyrido[2,3 - b] indole bimaleate, respectively.

EXAMPLE 17

(a) 3-(3-N-carbobenzoxyaminopropyl)-1-methyl-3-phenyloxindole

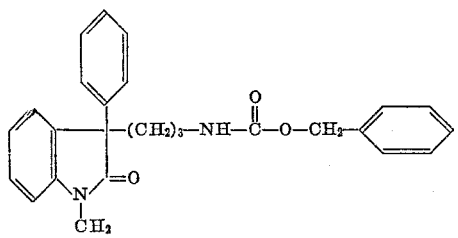

Dissolve (in several portions) 6.8 parts of a 50% suspension (in mineral oil) of sodium hydride in a solution (under stirring and under an atmosphere of nitrogen) of 51 parts of 3-(3-N-carbobenzoxyaminopropyl)-3-phenyloxindole (Example 14a) in 350 parts by volume of absolute DMF. Heat the resulting solution at 50° for two hours, cool the resultant in an ice bath, and then admix the cooled material with 24.2 parts of methyl iodide. Stir the thus-obtained reaction mixture at room temperature for seventeen hours and then heat same for one hour at 50°. Evaporate the resultant in vacuo to obtain (a) as a syrup.

(b) 3-(3-aminopropyl)-1-methyl-3-phenyloxindole hydrochloride

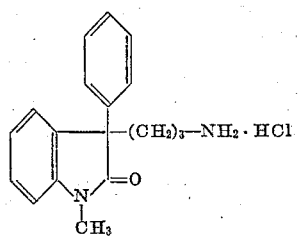

Dissolve 62 parts of (a) in 250 parts by volume of ethanol containing 12 parts of 10% pd/C catalyst. Shake the resultant in a hydrogen (50 p.s.i.g.) atmosphere for twenty-four hours. Then filter off the catalyst and evaporate the filtrate.

Dissolve the residue in a mixture of 150 parts by volume of diethylether and 300 parts by volume of 10% (aq.) hydrochloric acid. Wash the hydrochloric acid phase with 100 parts by volume of diethylether, and then cool same to precipitate (b), M.P. 166°–170°.

(c) 9-methyl-4a-phenyl-2,3,4,4a,9,9a-hexahydro-1H-pyrido[2,3-b]indole bimaleate

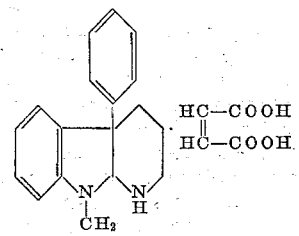

Add (over a period of 30 minutes and at 90°) 20 parts of sodium to 4 parts of (b) in 350 parts by volume of n-butanol. Heat the resulting solution for an additional hour at 90°, cool the obtained material and pour same into 700 parts by volume of water. Wash the water layer with diethylether. Combine the ether and butanol extracts, dry the combined extracts and evaporate the thus-dried extracts.

Admix the residue with 1.7 parts of maleic acid to obtain (c), M.P. 149°–151°.

EXAMPLE 18

(a) 3-cyanomethyl-1-isopropyl-3-phenyloxindole

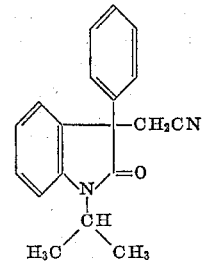

Dissolve (in several portions) 5.3 parts of a 54% suspension (in mineral oil) of sodium hydride in a solution (under stirring and under an atmosphere of hydrogen) of 24.8 parts of 3-cyanomethyl-3-phenyloxindole in 160 parts by volume of absolute DMF. Heat the resulting solution at 50° for two hours; cool said heated solution in an ice bath, and then admix the obtained material with 13.5 parts or isopropyl bromide.

Stir the thus-obtained reaction mixture at room temperature for seventeen hours and then heat for one hour at 50° before evaporating same in vacuo. Crystallize the thus-produced residue from methanol/water to obtain (a), M.P. 102°–105°.

(b) 3-(2-aminoethyl)-2-hydroxy-1-isopropyl-3-phenyloxindoline

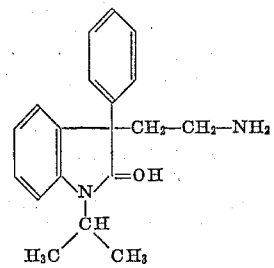

Add dropwise over a period of one hour a solution of 9.0 parts of (a) in 200 parts by volume of THF to a refluxing solution (under stirring) of 2.4 parts of LAH in 250 parts by volume of diethylether. Stir (without heating) the thus-refluxed material for an additional half hour before adding thereto excess (to destroy remaining LAH) ethyl acetate and water.

Filter the thus-obtained reaction mixture through Celite, and concentrate the filtrate in vacuo to obtain (b) as an oil.

(c) 8-isopropyl-3a-phenyl-1,2,3,3a,8,8a-hexahydropyrrolo[2,3-b]indole bimaleate

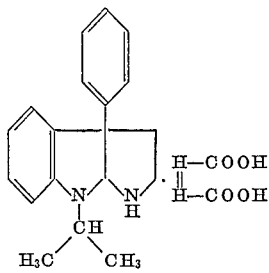

Dissolve (b) in diethylether and wash the resulting solution with dilute (aq) hydrochloric acid. Add sodium carbonate ($Na_2CO_3$) to the hydrochloric acid phase until it is basic to litmus, and then extract the resulting basic phase with diethylether. Dry the ether extract, and then evaporate the ether therefrom.

Admix 3.8 parts of maleic acid with the residue, and crystallize the precipitate from ethanol/diethylether to obtain (c), M.P. 170°–172°.

Replacing the isopropyl bromide (step a) with an equivalent of propargyl bromide or allyl chloride results in the preparation, in similar manner, of 8-propargyl- or 8 - allyl-3a-phenyl-1,2,3,3a,8,8a-hexahydropyrrolo[2,3-b]indole bimaleate respectively.

EXAMPLE 19

(a) 5-chloro-3-acetonyl-3-phenyloxindole

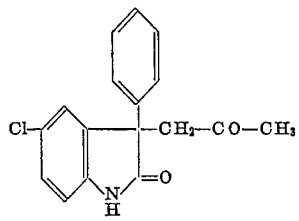

Add with stirring 16.8 parts of sodium hydride suspension (50% in mineral oil) to a solution of 75 parts of 5-chloro-3-phenyloxindole in 400 parts by volume of absolute DMF. Heat the resulting mixture at 50° for two hours. Then cool same in an ice bath before adding thereto 34.2 parts of chloro-2-propanone.

Stir the thus-obtained mixture overnight at room temperature before heating same for one hour at 60°. Then evaporate the resultant in vacuo. Dissolve the obtained residue in methylene chloride, wash the resulting solution with water, evaporate the organic layer in vacuo, and crystallize the residue from methanol to obtain the title compound, M.P. 183°–186°.

(b) 5-chloro-1-methyl-3-acetonyl-3-phenyloxin-dole

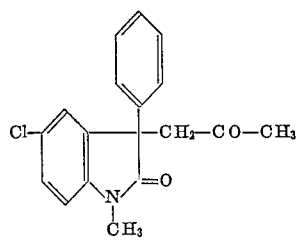

Add 6.6 parts of sodium hydride suspension (50% in mineral oil) to a stirred solution (under nitrogen) of 50 parts of (a) in 500 parts by volume of absolute DMF. Heat the resulting mixture at 50° for two hours before cooling same in an ice bath. Then add thereto 23.2 parts of methyl iodide. Thereafter, stir the resultant overnight at room temperature before heating same at 50° for one hour. Evaporate the thus-prepared solution in vacuo and crystallize the residue from a 1:1 mixture of diethylether and water to obtain the title compound, M.P. 134°–136°.

(c) 5-chloro-1-methyl-3-(2-oximinopropyl)-3-phenyloxindole

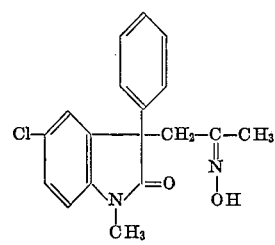

Reflux for five hours a mixture of 35 parts of (b), 16.7 parts of hydroxylamine hydrochloride, 38.5 parts of sodium acetaate and 350 parts by volume of ethanol. Add the hot refluxed mixture to 3000 parts by volume of water and filter the precipitated crystals of title compound, M.P. 179°–182°.

(d) 5-chloro-2,8-dimethyl-3a-phenyl-1,2,3,3a,8,8a-hexahydropyrrolo[2,3-b]indole hydrochloride

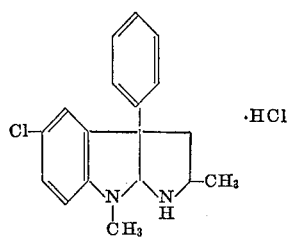

Add (with stirring) a solution of 42 parts of (c) in 400 parts by volume of THF to a solution of 21 parts of LAH in 3000 parts by volume of diethylether. Reflux the obtained mixture for 16 hours before adding 175 parts by volume of water thereto and cooling to room temperature. Filter the resultant through Celite, evaporate the filtrate in vacuo, and dissolve the residue in a mixture of 30 parts by volume of water and 100 parts by volume of 2 N hydrochloric acid. Cool the thus-obtained solution to 0°. Filter the precipitated solids, and crystallize said solids twice from methanol (saving the mother liquor from the first crystallization) to obtain a geometric isomer, M.P. 274°–275° (dec.) of title compound.

(e) 5-chloro-2,8-dimethyl-3a-phenyl-1,2,3,3a,8,8a-hexahydropyrrolo[2,3-b]indole hydrochloride Evaporate the mother liquor from the first methanol crystallization of (d), and crystallize the thus-obtained residue twice from 1:2 methanol/diethylether to obtain the other geometric isomer, M.P. 258° (dec.), of title compound of (d).

When there is a lower alkyl group in the 2-position of compounds I, there are two optically inactive (racemic) geometric isomers, depending upon whether the lower alkyl groups is cis- or trans- to ring B. Parts (d) and (e) of Example 19 illustrate the separation of these geometric isomers. Each of said isomers is resolved into its respective enantiomers by techniques well-known to the art skilled.

EXAMPLE 20

(a) 2-acetamidoethyl iodide

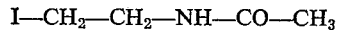

Dissolve 37.6 parts of 2-aminoethyl iodide hydroiodide in a solution of 4.0 parts of NaOH in 60 parts by volume of water. Cool the obtained solution in an ice bath. With stirring add dropwise and simultaneously thereto 10.2 parts of acetic anhydride and a solution of 4.0 parts of NaOH in 30 parts by volume of water (over a period of thirty-five minutes). Stir the resultant for one hour, and then extract same with three 100-part-by-volume portions of diethylether. Dry the combined extracts over sodium sulfate, and then evaporate them to obtain (a) as an oil.

(b) 3-acetamidoethyl-5-chloro-3-phenyloxindole

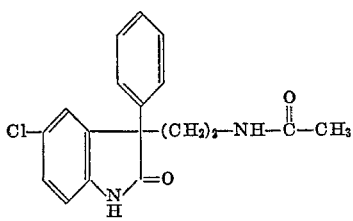

Dissolve (under an atmosphere of nitrogen) 2.6 parts of a 50% suspension (in mineral oil) of sodium hydride in several portions in a solution (under stirring) of 12.1 parts of 5-chloro-3-phenyloxindole in 80 parts by volume of absolute DMF. Heat the resulting solution at 50° for 3 hours; cool the thus-treated material in an ice bath; admix the resultant with 11 parts of (a); stir the thus-obtained reaction mixture for seventeen hours before heating same at 60° for three hours. Evaporate the resultant in vacuo to obtain (b) as an oil.

(c) 5-chloro-1-ethyl-3a-phenyl-1,2,3,3a,8,8a-hexahydropyrrolo[2,3-b]indole

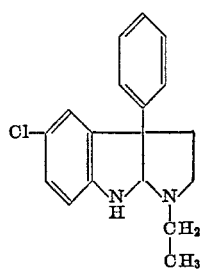

Add a solution of 10 parts of 3-(2-acetamidoethyl)-5-chloro-3-phenyloxindole (b) in 100 parts by volume of THF to a solution of 7 parts of LAH in 200 parts by volume of diethylether and reflux the resulting reaction mixture for seventeen hours. Then cool the reaction mixture and decompose same by admixing 28 parts by volume of water therewith. Filter the resultant through Celite and evaporate the filtrate in vacuo to obtain (c) as an oil.

The invention will be understood from the foregoing description. Various changes may be made in the processes, the intermediates and the final products without departing from the spirit or scope of the invention or sacrificing its material advantages. The processes, the novel intermediates and the final products hereinbefore described as merely illustrative embodiments of the invention.

What is claimed is:

1. A pharmaceutically acceptable compound selected from the group consisting of (a) a compound of the formula

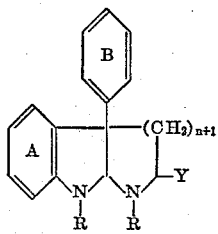

wherein: $n$ is either 0, 1 or 2; each R is, independently, a member selected from the group consisting of a hydrogen atom and R'; each R' is, independently, selected from the group consisting of lower alkyl, phenyl(lower)alkyl, allyl and propargyl; Y is a member selected from the group consisting of a hydrogen atom and lower alkyl; ring A bears from zero to four substituents, each of which is selected from the group consisting of chloro, fluoro, bromo, hydroxy, lower alkoxy, lower alkyl and, together with its counterpart on an adjacent ring A carbon atom, methylenedioxy; and ring B bears from zero to three substituents, each of which is in one of the 3-, 4- and 5-positions and is selected from the group consisting of chloro, fluoro, bromo, lower alkyl, lower alkoxy, trifluoromethyl, cycloalkyl having from 5 to 7 carbon atoms, phenyl and, together with its counterpart on an adjacent ring B carbon atom in one of the stated positions, methylenedioxy; no two members selected from the group consisting of trifluoromethyl, cycloalkyl, phenyl and tertiary butyl being bound to adjacent carbon atoms and (b) pharmaceutically acceptable acid addition salts thereof.

2. A compound according to claim 1 wherein Y is lower alkyl.

3. The compound according to claim 2 which is cis-5-chloro-2,8-dimethyl-3a-phenyl-1,2,3,3a,8,8a - hexahydropyrrolo[2,3-b]indole hydrochloride.

4. The compound according to claim 2 which is trans-5-chloro-2,8-dimethyl - 3a - phenyl-1,2,3,3a,8,8a-hexahydropyrrolo[2,3-b]indole hydrochloride.

5. A compound according to claim 1 wherein Y is a hydrogen atom.

6. A compound according to claim 5 wherein $n$ is zero.

7. A compound according to claim 6 wherein each R is, independently, a member selected from the group consisting of methyl, ethyl, propyl, isopropyl and butyl.

8. The compound according to claim 7 which is 1,8-dimethyl - 3a - phenyl - 1,2,3,3a,8,8a - hexahydropyrrolo [2,3-b]indole hydrochloride.

9. A compound according to claim 6 wherein the R in the 1-position is a member selected from the group consisting of methyl, ethyl, propyl, isopropyl and butyl, and the R in the 8-position is a hydrogen atom.

10. The compound according to claim 9 which is 1-methyl - 3a - phenyl - 1,2,3,3a,8,8a - hexahydropyrrolo [2,3-b]indole bimaleate.

11. The compound according to claim 9 which is 5-chloro - 1 - methyl - 3a - phenyl-1,2,3,3a,8,8a-hexahydropyrrolo[2,3-b]indole hydrochloride.

12. The compound according to claim 9 which is 5-methoxy - 1 - methyl-3a-phenyl-1,2,3,3a,8,8a-hexahydropyrrolo[2,3-b]indole hydrochloride.

13. The compound according to claim 9 which is 5-chloro-1-ethyl-3a-phenyl-1,2,3,3a,8,8a - hexahydropyrrolo [2,3-b]indole.

14. A compound according to claim 6 wherein the R in the 1-position is phenyl(lower)alkyl and the R in the 8-position is a hydrogen atom.

15. The compound according to claim 14 which is 1-(1-methyl-2-phenylethyl) - 3a - phenyl-1,2,3,3a,8,8a-hexahydropyrrolo[2,3-b]indole bimaleate.

16. A compound according to claim 6 wherein the R in the 1-position is a hydrogen atom and the R in the 8-position is a member selected from the group consisting of methyl, ethyl, propyl, isopropyl and butyl.

17. The compound according to claim 16 which is 8-methyl - 3a - phenyl - 1,2,3,3a,8,8a-hexahydropyrrolo [2,3-b]indole hydrochloride.

18. The compound according to claim 16 which is 8-isopropyl - 3a - phenyl-1,2,3,3a,8,8a-hexahydropyrrolo [2,3-b]indole bimaleate.

19. A compound according to claim 6 wherein each R is a hydrogen atom.

20. The compound according to claim 19 which is 3a-phenyl-1,2,3,3a,8,8a-hexahydropyrrolo[2,3-b]indole.

21. The compound according to claim 19 which is 5-methoxy-3a-phenyl-1,2,3,3a,8,8a - hexahydropyrrolo[2,3-b]indole.

22. The compound according to claim 19 which is 5-chloro-3a-phenyl-1,2,3,3a,8,8a-hexahydropyrrolo[2,3 - b]indole.

23. The compound according to claim 19 which is 5-chloro-3a-p-chlorophenyl-1,2,3,3a,8,8a - hexahydropyrrolo [2,3-b]indole.

24. A compound according to claim 6 wherein the R in the 1-position is a member selected from the group consisting of a hydrogen atom and lower alkyl having at most four carbon atoms, and the R in the 8-position is benzyl.

25. A compound according to claim 6 wherein the R in the 1-position is a member selected from the group consisting of a hydrogen atom and lower alkyl having at most four carbon atoms, and the R in the 8-position is allyl.

26. A compound according to claim 6 wherein the R in the 1-position is a member selected from the group consisting of a hydrogen atom and lower alkyl having at most four carbon atoms, and the R in the 8-position is propargyl.

27. A compound according to claim 5 wherein $n$ is one.

28. A compound according to claim 27 wherein each R is, independently, a member selected from the group of methyl, ethyl, propyl, isopropyl and butyl.

29. A compound according to claim 27 wherein the R in the 1-position is lower alkyl having at most four atoms, and the R in the 9-position is a hydrogen atom.

30. The compound according to claim 29 which is 1-methyl-4a-phenyl-2,3,4,4a,9,9a-hexahydro-1H - pyrido[2,3-b]indole hydrochloride.

31. The compound according to claim 29 which is 6-chloro-1-methyl-4a-phenyl-2,3,4,4a,9,9a-hexahydro - 1H-pyrido[2,3-b]indole hydrochloride.

32. A compound according to claim 27 wherein the R in the 1-position is a hydrogen atom and the R in the 9-position is lower alkyl having at most four carbon atoms.

33. The compound according to claim 32 which is 9-methyl-4a-phenyl-2,3,4,4a,9,9a-hexahydro-1H - pyrido[2,3-b]indole bimaleate.

34. A compound according to claim 27 wherein each R is a hydrogen atom.

35. The compound according to claim 34 which is 4a-phenyl-2,3,4,4a,9,9a-hexahydro-1H-pyrido[2,3 - b]indole bimaleate.

36. A compound according to claim 5 wherein $n$ is two.

37. A compound to claim 36 wherein each R is, independently, a member selected from the group consisting of a hydrogen atom and a lower alkyl having at most four carbon atoms.

References Cited

UNITED STATES PATENTS 2,688,022   8/1954   Burtner.
3,216,898   11/1965  Fellows.
3,301,866   1/1967   Drapper.

OTHER REFERENCES

Kolosov et al., Chem. Abst., vol. 49, cols. 3208–3209 (1955).

HENRY R. JILES, Primary Examiner

G. T. TODD, Assistant Examiner

U.S. Cl. X.R.

260—294, 294.7, 326.3, 326.5, 326.8, 326.85, 482; 424—244, 267, 274